UNITED STATES PATENT OFFICE.

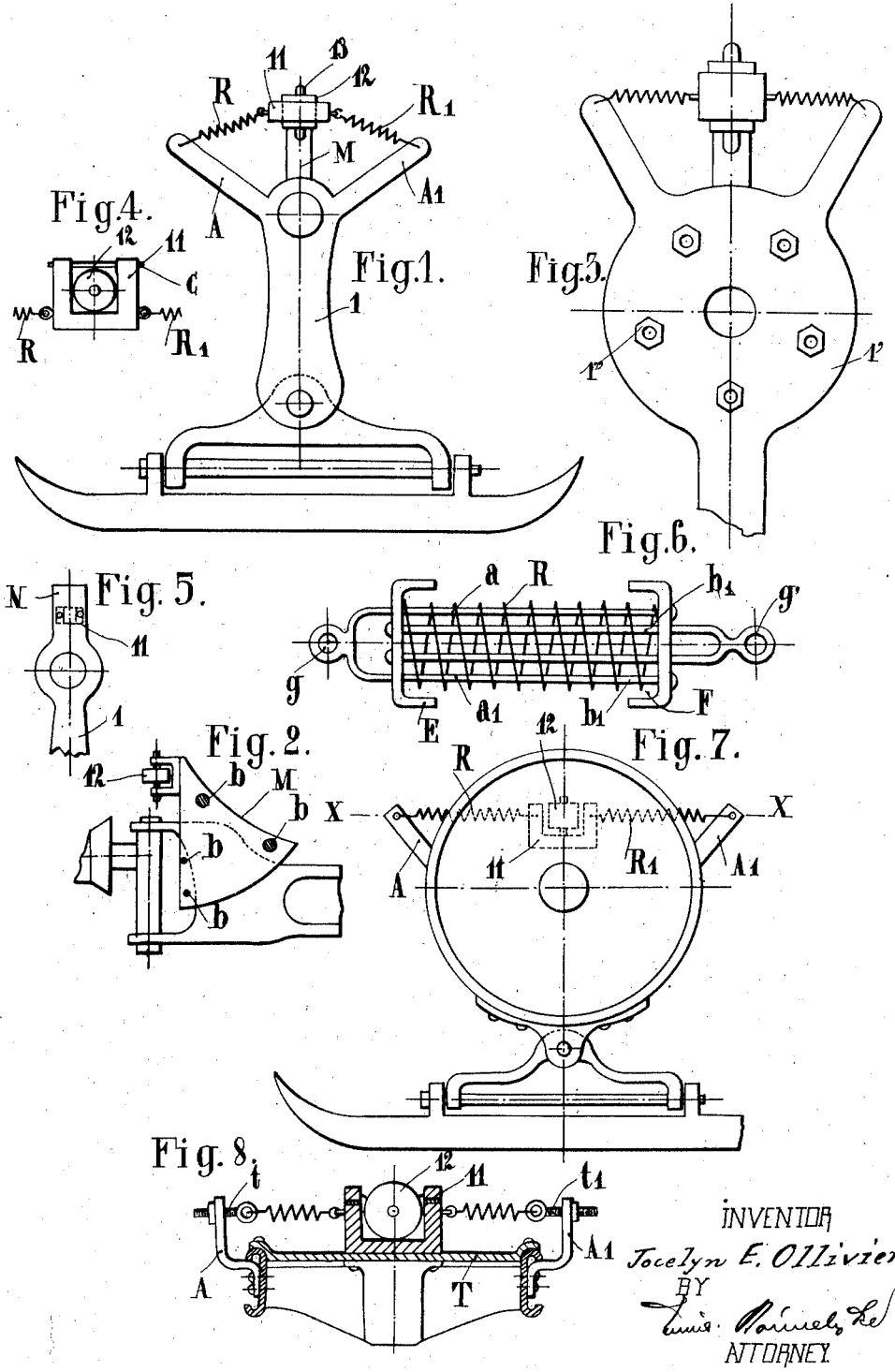

JOCELYN EMILE OLLIVIER, OF ST. GERVAIS, FRANCE.

RUNNER ATTACHMENT FOR MOTOR-VEHICLES.

1,396,658.  Specification of Letters Patent.  Patented Nov. 8, 1921.

Application filed October 27, 1920. Serial No. 419,958.

*To all whom it may concern:*

Be it known that I, JOCELYN EMILE OLLIVIER, a citizen of the Republic of France, and resident at St. Gervais, H$^{te}$ Savoie, (post-office address Villa La Vignette,) France, have invented a new and useful Runner Attachment for Motor-Vehicles, which device is fully set forth in the following specification.

This invention relates to a device intended to effect partial conversion of a motor car into a sleigh by completely removing the front wheels of the said car and replacing them by runners; the invention being an improvement on or development of that disclosed in my prior Patent No. 1,346,052, granted July 6, 1920.

This invention is illustrated by way of example in the accompanying drawings in which—

Figure 1 is a side view of one form of runner-carrying rod according to the invention.

Fig. 2 a detail view showing the connection of the wheel element of the stop device to the axle.

Fig. 3 is a side view of the enlarged upper end or head of a runner carrying rod which is designed to replace a detachable wheel of Michelin type.

Fig. 4 is a detail view showing the connection of the springs to the jaw member of the stop device.

Fig. 5 shows a runner-carrying rod having a slightly different form of head.

Fig. 6 is a detail view showing the mounting of the compression spring, and

Figs. 7 and 8 show the invention applied to a wheel from which the tire has been removed and which takes the place of the rod, Fig. 7 being a side elevation and Fig. 8 a horizontal section on line X—X of Fig. 7.

Fig. 1 shows a runner carrying rod, the locking or stop device of which is arranged above the knuckle or spindle of the axle. (Figs. 1 and 2.)

The runner-carrying rod 1 has two extensions or arms A A$^1$ which are secured by means of springs R, R$^1$ to the U-shaped jaw or fork 11 which straddles the wheel 12 and forms one element of the stop device. The wheel 12 forms the other element of the stop device and is secured to the axle in any desired manner (for instance by means of two plates M arranged at opposite sides of the steering spindle of the axle and connected together by bolts $b$, Fig. 2).

Fig. 4 shows in detail the method of mounting the springs R, R$^1$ on the jaw 11.

Fig. 3 shows a construction of runner carrying rod which can be fitted to a car provided with detachable wheels of Michelin type.

In order to obtain the said result, on the disk-shaped head 1′ of the rod are arranged several fastening bolts 1″.

In Fig. 5, the jaw 11 is secured direct, without interposition of any spring, to the extension N of the rod 1.

In Figs. 7 and 8, a wheel from which the tire has been removed, is utilized as the rod. To the rim of this wheel are then secured the two arms A, A$^1$ which are connected as before, to the jaw 11 by means of the springs R, R$^1$. Fig. 8 shows in detail this method of mounting. The jaw 11 rests on a sheet metal plate T (see Fig. 5) on which it can slide. The plate T is firmly secured to the wheel.

Fig. 6 shows a convenient device for supporting the compression spring R which in this instance is held between two circular caps E and F. Two rods $a$ and $a^1$ are secured to the cap F and pass slidably through the cap E, these two rods terminating in a hook $g$. Two other rods $b^1$, $b^1$ are secured to the cap E and slide in the cap F and terminate in hook $g^1$.

In all of the forms of the invention above described, the runner has a universal connection with the foot of the carrier of such a nature that it may rock relatively to said carrier about both its transverse and its longitudinal axis, as disclosed in my above-identified patent. The stop device used in connection with the carrier maintains the latter in substantially vertical position and prevents it from turning about the axis of the axle spindle to which it is attached.

I claim as my invention:

1. An attachment to be substituted for an automobile wheel, comprising a runner carrier adapted to be fastened to the adjacent steering spindle on one axle of the automobile; a runner connected with the foot of the carrier to rock relatively thereto about both its transverse and its longitudinal axis; and a stop device for preventing the carrier from turning about the axis of the spindle and embodying a wheel fixed to said axle above and substantially in line with the axis of pivotal movement of the spindle, a pair of diverging arms fastened to the upper portion of the carrier, and a fork interposed between and connected with said arms and straddling said wheel.

2. An attachment to be substituted for an automobile wheel, comprising a runner carrier adapted to be fastened to the adjacent steering spindle on one axle of the automobile; a runner connected with the foot of the carrier to rock relatively thereto about both its transverse and its longitudinal axle; and a stop device for preventing the carrier from turning about the axis of the spindle and embodying a wheel fixed to said axle above and substantially in line with the axis of pivotal movement of the spindle, a pair of diverging arms fastened to the upper portion of the carrier, a fork interposed between said arms and straddling said wheel, and a pair of supporting springs disposed at opposite sides of said fork and connected at their inner ends with the fork and at their outer ends with said arms.

3. An attachment to be substituted for an automobile wheel, comprising a runner carrier adapted to be fastened to the adjacent steering spindle on one axle of the automobile; a runner connected with the foot of the carrier to rock relatively thereto about both its transverse and its longitudinal axle; and a stop device for preventing the carrier from turning about the axis of the spindle and embodying a wheel fixed to said axle above and substantially in line with the axis of pivotal movement of the spindle, and a fork connected with the upper portion of said carrier and straddling said wheel.

4. An attachment to be substituted for an automobile wheel, comprising a runner-carrying wheel adapted to be fastened to the adjacent steering spindle on one axle of the automobile; a runner fastened directly to the lower portion of the rim of said wheel to rock relatively thereto about both its transverse and its longitudinal axis; and a stop device for preventing said wheel from turning about the axis of the spindle and embodying a wheel fixed to said axle above and substantially in line with the axis of pivotal movement of the spindle, a pair of diverging arms fastened to the upper portion of the runner-carrying wheel, a fork interposed between said arms and straddling the second-named wheel, and a pair of supporting springs disposed at opposite sides of said form and connected at their inner ends with the form and at their outer ends with said arms.

In testimony whereof I have signed this specification.

JOCELYN EMILE OLLIVIER.